(12) United States Patent
Bahgat et al.

(10) Patent No.: US 9,483,944 B2
(45) Date of Patent: *Nov. 1, 2016

(54) PREDICTION OF FREE PARKING SPACES IN A PARKING AREA

(71) Applicant: International Business Machines Corporation, Armonk, NY (US)

(72) Inventors: Mohamed A. Bahgat, October (EG); Ossama S. Emam, Mohandessen (EG); Ayman S. Hanafy, Giza (EG); Sara A. Noeman, October (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,444

(22) Filed: Dec. 2, 2015

(65) Prior Publication Data

US 2016/0086488 A1    Mar. 24, 2016

Related U.S. Application Data

(63) Continuation of application No. 14/075,626, filed on Nov. 8, 2013, now Pat. No. 9,275,547.

(51) Int. Cl.
*B60Q 1/48* (2006.01)
*G08G 1/14* (2006.01)
(Continued)

(52) U.S. Cl.
CPC ............... *G08G 1/14* (2013.01); *G06N 7/005* (2013.01); *G08G 1/0175* (2013.01); *G08G 1/146* (2013.01)

(58) Field of Classification Search
CPC .......................... G08G 1/146; G08G 1/0175
USPC ...................................... 340/932.2
See application file for complete search history.

(56) References Cited

U.S. PATENT DOCUMENTS 3,541,308 A * 11/1970 Ruby ............... G07B 15/04
                                                    235/378
7,342,511 B2 * 3/2008 Schuette ............ G08G 1/146
                                                    340/5.2
(Continued)

FOREIGN PATENT DOCUMENTS

CN       102214327 A      10/2011
DE    102009021014 A1    11/2009
(Continued)

OTHER PUBLICATIONS

Caicedo, et al., "Prediction of parking space availability in real time", Expert Systems with Applications 39 (2012) 7281-7290, journal homepage <www.elsevier.com/locate/eswa>.

(Continued)

*Primary Examiner* — Kerri McNally
(74) *Attorney, Agent, or Firm* — Daniel R. Simek (57) ABSTRACT

Embodiments of the present invention disclose a computer implemented method, computer program product, and system for management of parking spaces in a parking area. Identifying an individual entering a parking area and a vehicle in the parking area that corresponds to the identified individual. Determining a distance between the identified individual and the identified vehicle in the parking area. Determining whether the identified individual is moving toward the identified vehicle. Responsive to determining that the identified individual is moving toward the identified vehicle, determining whether the determined distance is less than an associated distance threshold condition. In another embodiment, detecting a parking ticket entering the parking area and identifying an individual and a vehicle in the parking area that correspond to the detected parking ticket.

20 Claims, 4 Drawing Sheets

(51) Int. Cl.
*G08G 1/017* (2006.01)
*G06N 7/00* (2006.01)

(56) References Cited

U.S. PATENT DOCUMENTS

| | | | |
|---|---|---|---|
| 8,004,400 B2 | 8/2011 | Tieman et al. | |
| 8,059,864 B2 | 11/2011 | Huang et al. | |
| 9,275,547 B2* | 3/2016 | Bahgat | G08G 1/146 |
| 2005/0168322 A1* | 8/2005 | Appenrodt | B60R 25/246 |
| | | | 340/5.72 |
| 2006/0220911 A1 | 10/2006 | Jaupitre et al. | |
| 2009/0243889 A1 | 10/2009 | Suhr et al. | |
| 2011/0102197 A1 | 5/2011 | Herwich | |
| 2011/0106425 A1 | 5/2011 | Trum et al. | |
| 2013/0132102 A1 | 5/2013 | Andrade et al. | |

FOREIGN PATENT DOCUMENTS

| | | |
|---|---|---|
| EP | 1701323 A1 | 9/2006 |
| EP | 2136346 A2 | 12/2009 |
| JP | 2001325633 A | 11/2001 |
| JP | 2006343800 A | 12/2006 |
| JP | 2007148671 A | 6/2007 |
| JP | 4096819 B2 | 6/2008 |
| KR | 2010033782 A | 3/2010 |
| WO | 2006106369 A1 | 10/2006 |

OTHER PUBLICATIONS

Salem, M., and Watson, D., "Person Tracking for Parking Space Vacancy Prediction", Department of Computer Science and Engineering, University of California, San Diego, La Jolla, CA.

"A Method and System to Easily Find Free Parking Space in a City Through Collaboration", an IP.com Prior Art Database Technical Disclosure, IPCOM000203813D, Feb. 2, 2011.

List of IBM Patents or Patent Applications Treated as Related, Appendix P, Filed Herewith, 2 pages.

Mohamed A. Bahgat, et al., "Prediction of Free Parking Spaces in a Parking Area", U.S. Appl. No. 14/075,626, filed Nov. 8, 2013.

* cited by examiner

PREDICTION OF FREE PARKING SPACES IN A PARKING AREA

FIELD OF THE INVENTION

The present invention relates generally to the field of parking area management, and more particularly to prediction of free parking spaces in a parking area.

BACKGROUND OF THE INVENTION

A parking area (i.e., parking lot, car park, parking garage, car lot, etc.) is a cleared area that is intended for parking vehicles. Parking areas can be of many varying sizes, and can be intended for use by varying types of vehicles (e.g., cars, bicycles, motorcycles, industrial vehicles, etc.). Depending on a location or an intended use, use of a parking area can be free of charge, or require payment of a fee. Many instances of parking areas that require payment of a fee utilize a ticketing system. Upon entry to a parking area, an individual in a vehicle can receive a ticket from an attendant working in the parking area, or an automated ticketing system. In an example, the ticket can indicate the time that the vehicle entered the parking area. Before exiting the parking area, the individual in the vehicle pays a required fee (e.g., to the attendant working in the parking area, or to the automated ticketing system utilized by the parking area), corresponding to the amount of time the vehicle was parked in the parking area. In another example, the ticket can indicate an amount of time the vehicle is entitled to park in the parking area (dependent on the amount of fee paid).

SUMMARY

Embodiments of the present invention disclose a computer implemented method, computer program product, and system for management of parking spaces in a parking area. In one embodiment, in accordance with the present invention, the computer implemented method includes the steps of identifying an individual entering a parking area and a vehicle in the parking area that corresponds to the identified individual, determining a distance between the identified individual and the identified vehicle in the parking area, determining whether the identified individual is moving toward the identified vehicle, and, responsive to determining that the identified individual is moving toward the identified vehicle, determining whether the determined distance is less than an associated distance threshold condition. In another embodiment, the method further includes the steps of detecting a parking ticket entering the parking area and identifying an individual and a vehicle in the parking area that correspond to the detected parking ticket.

DETAILED DESCRIPTION

Embodiments of the present invention allow for determining whether an occupied parking space in a parking area is ready to be free. In one embodiment, an individual entering a parking area is identified, along with a vehicle that corresponds to the individual. Responsive to movement of the individual in the parking area, previously stored statistics of the vehicle that corresponds to the individual, and location of other individuals associated with the vehicle, a determination is made of whether or not the parking space occupied by the vehicle is ready to be free. In another embodiment, a location of a parking ticket corresponding to the vehicle is also utilized to determine whether or not the parking space occupied by the vehicle is ready to be free.

Embodiments of the present invention recognize that locating a free parking space within a large parking area can be a time consuming task. Many times a vehicle moves past a parking space that is not currently free, but becomes free a short time after the vehicle passes the space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++, or the like, and conventional procedural programming languages, such as the C programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
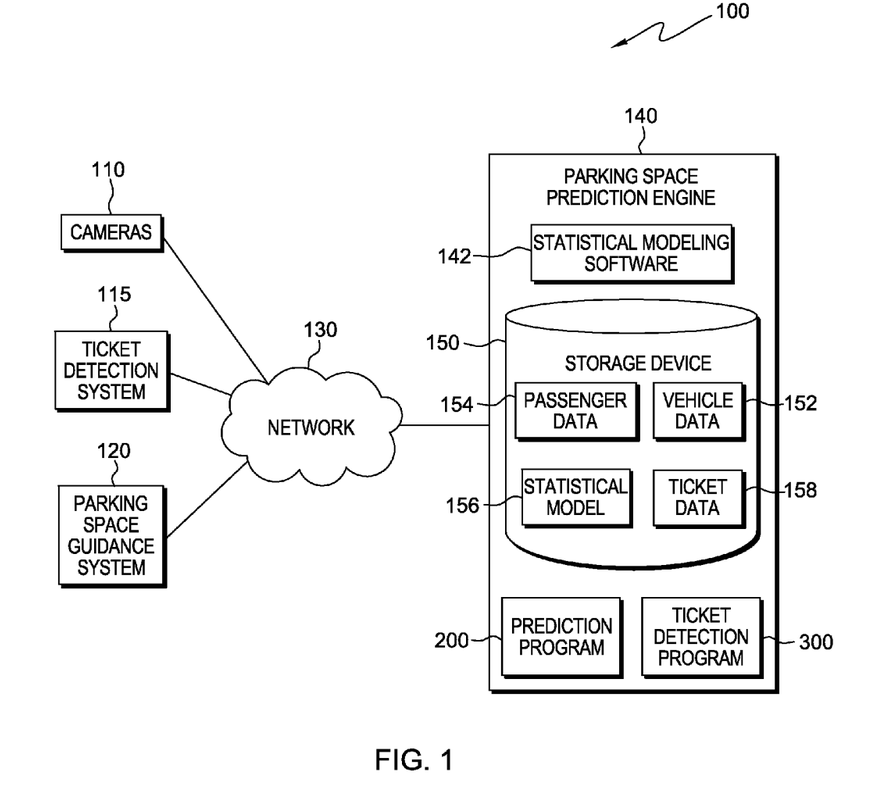
FIG. 1 is a functional block diagram of a data processing environment in accordance with an embodiment of the present invention.

The present invention will now be described in detail with reference to the Figures. FIG. 1 is a functional block diagram illustrating data processing environment 100, in accordance with one embodiment of the present invention.

An embodiment of data processing environment 100 includes cameras 110, ticket detection system 115, parking space guidance system 120, and parking space prediction engine 140, all interconnected over network 130. Cameras 110 are devices capable of capturing images (e.g., digital cameras), and video (e.g., digital video cameras), and sending the captured images and video to parking space prediction engine 140 via network 130. In one embodiment, cameras 110 are located throughout a parking area, and capture images and video of individuals and vehicles in the parking area (e.g., entering a parking area, movement within a parking area, etc.). Images and video that cameras 110 capture is of a resolution and image quality that allow for comparison of characteristics of individuals and vehicles in the parking area.

Ticket detection system 115 includes sensors that have the capability to detect a parking ticket (e.g., radio-frequency identification (RFID) sensors), and communicate data associated with parking tickets to parking space prediction engine 140 via network 130. In one embodiment, ticket detection system 115 includes sensors located throughout a parking area, and can detect individuals in possession of parking tickets while the individuals are moving through the parking area. Parking tickets are associated with a vehicle in the parking area, and the corresponding parking space of the vehicle. In an example, a parking ticket includes RFID identification capabilities, allowing identification and communication with ticket detection system 115.

Parking space guidance system 120 is a series of displays that provide information to individuals in the parking area. In example embodiments, parking space guidance system 120 displays locations and routes to parking spaces in the parking area that are free or ready to be free. Parking space guidance system 120 receives data to display from parking space prediction engine 140 via network 130.

In one embodiment, cameras 110, ticket detection system 115, parking space guidance system 120, and parking space prediction engine 140 communicate through network 130. Network 130 can be, for example, a local area network (LAN), a telecommunications network, a wide area network (WAN) such as the Internet, or a combination of the three, and include wired, wireless, or fiber optic connections. In general, network 130 can be any combination of connections and protocols that will support communications between cameras 110, ticket detection system 115, parking space guidance system 120, and parking space prediction engine 140 in accordance with embodiments of the present invention.

In one embodiment, parking space prediction engine 140 receives data associated with individuals, vehicles, and tickets in a parking area from cameras 110 and ticket detection system 115 via network 130. Parking space prediction engine 140 includes statistical modeling software 142, storage device 150, prediction program 200, and ticket detection program 300. In example embodiments, parking space prediction engine 140 can be a desktop computer, computer server, or any other computer system known in the art, in accordance with embodiments of the invention. In certain embodiments, parking space prediction engine 140 represents computer systems utilizing clustered computers and components (e.g., database server computers, application server computers, etc.), that act as a single pool of seamless resources when accessed by elements of data processing environment 100 (e.g., cameras 110, ticket detection system 115, and parking space guidance system 120). In general, parking space prediction engine 140 is representative of any electronic device or combination of electronic devices capable of executing machine-readable program instructions, as described in greater detail with regard to FIG. 4, in accordance with embodiments of the present invention.

Storage device 150 includes vehicle data 152, passenger data 154, statistical model 156, and ticket data 158. Storage device 150 can be implemented with any type of storage device that is capable of storing data that may be accessed and utilized by parking space prediction engine 140, such as a database server, a hard disk drive, or flash memory. In other embodiments, storage device 150 can represent multiple storage devices within parking space prediction engine 140.

Each instance of vehicle data 152 includes data captured by cameras 110 and ticket detection system 115 corresponding to a specific vehicle in the parking area. In an embodiment, upon a vehicle entering a parking area, cameras 110 capture identification information (e.g., license plate, color, size, etc.), and a parking space corresponding to the vehicle. The captured identification information and parking space are included in vehicle data 152 and stored on storage device 150 corresponding to the vehicle. In another embodiment, vehicle data 152 also includes historical data corresponding to vehicles that have utilized the parking area (e.g., number of times a vehicle has utilized the parking area, frequency that a vehicle has utilized the parking area, previous durations of time that a vehicle has remained in the parking area). For example, vehicle data 152 includes an indication of whether a vehicle is a registered user of the parking area, frequently utilizes the parking area, or an infrequent user of the parking area (e.g., is utilizing the parking area for the first time). Parking space prediction engine 140 utilizes received identification information from cameras 110 to update historical data included in vehicle data 152 each time a vehicle utilizes the parking area. In one embodiment, parking space prediction engine 140 identifies vehicle data 152 corresponding to a vehicle utilizing the parking area by comparing identification information received by cameras 110 to stored identification information in vehicle data 152.

Passenger data 154 includes data captured by cameras 110 and ticket detection system 115 corresponding to individuals utilizing the parking area. In an embodiment, cameras 110 capture identification characteristics (e.g., visual features of individuals, color of clothing, etc.), that correspond to individuals in the parking area, and a corresponding vehicle (i.e., the vehicle that the individual is a passenger of and arrived to the parking area in). The captured identification characteristics of the individuals in the parking area are included in passenger data 154 and stored on storage device 150. Passenger data 154 is associated with the instance of vehicle data 152 of the vehicle corresponding to the individual (e.g., the vehicle that the individual arrived in).

For example, a vehicle arrives in a parking area and parks in a parking spot. Upon exiting the vehicle, cameras 110 capture identification characteristics of one or more individuals that exit the vehicle (i.e., the passengers of the vehicle). Cameras 110 also capture identification information and the parking space of the vehicle, which is stored in storage device 150 as vehicle data 152 corresponding to the vehicle. The captured identification characteristics of each of the one or more individuals are stored as passenger data 154 corresponding to each of the one or more individuals. Each instance of passenger data 154 is associated with vehicle data 152 of the corresponding vehicle that cameras 110 captured the one or more individuals exiting.

Statistical model 156 is a probabilistic model that is based upon vehicles' arrival times to the parking area, and departure times from the parking area. Parking space prediction engine 140 utilizes statistical modeling software 142 to create statistical model 156 based on vehicle data 152. In an embodiment, for a vehicle that is a registered user of the parking area or a vehicle that frequently utilizes the parking area, parking space prediction engine 140 utilizes statistical modeling software 142 to create an instance of statistical model 156 based on vehicle data 152 of the vehicle. Statistical model 156 is based on the historical data (e.g., arrival times to the parking area, and departure times from the parking area), associated with vehicle data 152. Statistical model 156 is stored in storage device 150 and associated with the corresponding instance of vehicle data 152. Parking space prediction engine 140 utilizes statistical model 156 to determine probabilities of a departure time of a vehicle from the parking area relative to the arrival time of the vehicle to the parking area. For example, if a vehicle has been in the parking area for twenty minutes, statistical model 156 indicates that there is a 35% probability that the vehicle will leave the parking area after twenty minutes (based on the vehicle's previous uses of the parking area).

Ticket data 158 includes fees associated with parking tickets, a vehicle corresponding to a parking ticket, and a parking space in the parking area that correspond to the parking ticket. For parking areas with a ticketing system (including a fee or without a fee), ticket data 158 exists for each ticket in use in the parking area. In an embodiment, upon entry to a parking area, a vehicle receives a parking ticket. Cameras 110 capture identification information and the parking space of the vehicle, which are included in vehicle data 152 and stored in storage device 150 corresponding to the vehicle. Ticket data 158 is stored in storage device 150 and is associated with an instance of vehicle data 152 that corresponds to the vehicle that received the parking ticket when entering the parking area.

Figure 2:
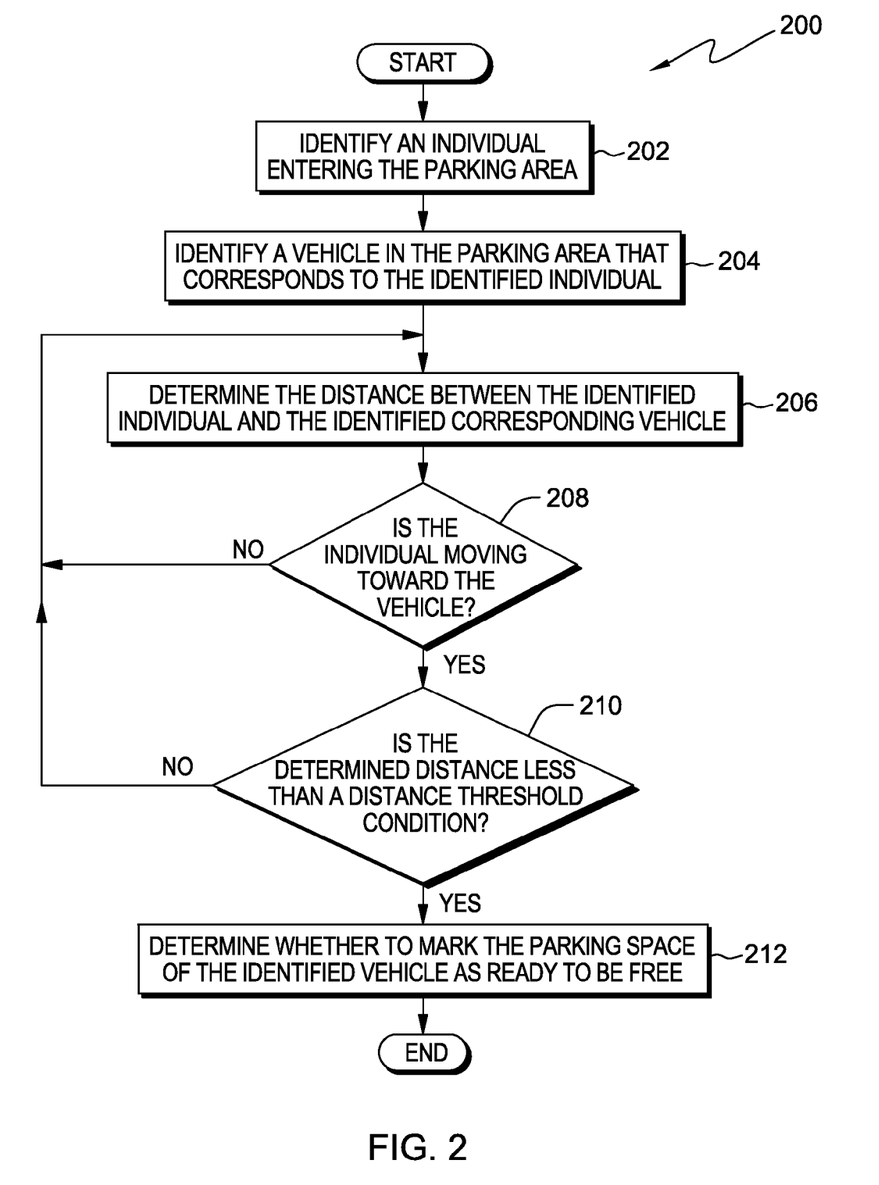
FIG. 2 is a flowchart depicting operational steps of a program for utilizing movement of an individual in a parking area to determine whether a parking spot is ready to be free.

In various embodiments, prediction program 200, which is discussed in greater detail with regard to FIG. 2, utilizes movement of an individual within a parking area to determine whether a parking spot is ready to be free. For example, ticket detection program 300, which is discussed in greater detail with regard to FIG. 3, utilizes movement of a parking ticket within a parking area to determine whether a parking spot is ready to be free.

FIG. 2 is a flowchart depicting operational steps of prediction program 200 in accordance with an embodiment of the present invention. In one embodiment, prediction program 200 initiates, responsive to cameras 110, detecting an individual entering the parking area that has identification characteristics that correspond to an instance of passenger data 154, and that instance of passenger data 154 is associated with an instance of vehicle data 152 that corresponds to a vehicle that is currently parked in the parking area. Prediction program 200 operates simultaneously for each individual identified in the parking area.

Prediction program 200 identifies an individual entering the parking area (step 202). In one embodiment, when an individual enters the parking area, cameras 110 capture images and video of the individual and send the images and video to parking space prediction engine 140. Prediction program 200 compares identification characteristics from the images and video of the individual to passenger data 154, and identifies the corresponding instance of passenger data 154. In an embodiment, prediction program 200 matches patterns in the identification characteristics of an individual entering the parking area to patterns in instances of passenger data 154. Prediction program 200 identifies corresponding passenger data 154 for each individual that enters the parking area. In one embodiment, prediction program 200 is continuously monitoring the movement of the identified individual in the parking area.

Prediction program 200 then identifies a vehicle in the parking area that corresponds to the identified individual (step 204). In one embodiment, prediction program 200 identifies the instance of vehicle data 152 that is associated with passenger data 154 (identified in step 202), corresponding to the individual that entered the parking area. Prediction program 200 utilizes associated vehicle data 152 to identify the parking space in the parking area of the vehicle of the identified individual that entered the parking area (identified in step 202).

Prediction program 200 then determines the distance between the identified individual and the identified corresponding vehicle (step 206). In one embodiment, prediction program 200 utilizes cameras 110 to monitor the location of the individual in the parking area. Prediction program 200 receives photos and video from cameras 110 to determine the distance between the identified individual and the parking space of the identified corresponding vehicle. In embodiments, prediction program 200 determines a section of the parking area (or other elements of the parking area), where the individual is currently located, and determines the distance from that section to the parking space of the identified corresponding vehicle. In another embodiment, prediction program 200 tracks the position of the individual in the parking area in relation to the parking space of the identified corresponding vehicle (e.g., in feet, yards, meters, etc.). In other embodiments, prediction program 200 can utilize photos and video received from cameras 110 as input into other forms of distance computation (e.g., Euclidian distance formula), to determine the distance between the identified individual and the identified corresponding vehicle.

Prediction program 200 then determines whether or not the individual is moving toward the vehicle (decision step 208). In one embodiment, prediction program 200 determines whether or not the individual is moving toward the parking space of the identified corresponding vehicle (identified in step 204). In one example, prediction program 200 determines an updated distance between the identified individual and the parking space of the identified corresponding vehicle (utilizing methods as discussed with regard to step 206). If prediction program 200 determines that the determined updated distance is less than the distance determined in step 206, then prediction program 200 determines that the individual is moving toward the parking space of the identified corresponding vehicle. In another example, prediction program 200 analyzes pictures and video receives from cameras 110 to identify directional movement of the individual. If prediction program 200 identifies that the individual is moving in a direction toward the parking space of the identified corresponding vehicle, then prediction program 200 determines that the individual is moving toward the parking space of the identified corresponding vehicle. Responsive to determining that the determined distance is not less than a distance threshold condition, prediction program 200 proceeds to step 206 (decision step 208, "no" branch). Prediction program 200 can store an indication that the individual is moving toward the parking space of the identified corresponding vehicle in the corresponding instance of passenger data 154.

Prediction program 200 then determines whether the determined distance is less than a distance threshold condition (decision step 210). In one embodiment, responsive to determining that the individual is moving toward the vehicle (decision step 208, "yes" branch), prediction program 200 determines whether the most recently determined distance of the individual (e.g., determined distance in step 206, determined updated distance in decision step 208), is less than a previously defined distance threshold condition. The distance threshold condition can include a predefined distance (e.g., 40 feet, 15 yards, 15 meters, etc.), or can be a percentage of the distance from a parking area entrance to the parking space of the vehicle (e.g., 45% of the total distance from the parking area entrance to the parking space of the identified corresponding vehicle). Distance threshold conditions can be created and customized relative to characteristics in use of the parking area. For example, individuals with associated passenger data 154 that indicated frequent use of the parking area may have a different corresponding distance threshold condition than other individuals. In another example, prediction program 200 can utilize different distance threshold conditions based on different time periods (e.g., parking area peak utilization period, night time, early morning, etc.). Responsive to determining that the determined distance is not less than a distance threshold condition, prediction program 200 proceeds to step 206 (decision step 210, "no" branch). Prediction program 200 can store an indication that the determined distance of the individual to the corresponding vehicle is less than the distance threshold in the corresponding instance of passenger data 154.

Prediction program 200 then determines whether to mark the parking space of the identified vehicle as ready to be free (step 212). In one embodiment, responsive to determining that the determined distance is less than a distance threshold condition (decision step 210, "yes" branch), prediction program 200 determines whether to mark the parking space of the identified vehicle as ready to be free. Prediction program 200 utilizes the indication that the determined distance of the individual to the parking space of the identified corresponding vehicle as one factor in the determination of whether or not to mark the parking space of the identified vehicle as ready to be free. In one embodiment, prediction program 200 also utilizes other factors, which may include: a number of passengers of the corresponding vehicle that have arrived at the parking space of the vehicle, a number of passengers of the corresponding vehicle that prediction program 200 detects are moving toward the parking space of the vehicle, and statistical model 156 associated with the corresponding vehicle. An individual is a passenger of a vehicle if passenger data 154 corresponding to the individual is associated with vehicle data 152 corresponding to the vehicle. In example embodiments, responsive to determining to mark a parking space as ready to be free, prediction program 200 utilizes parking space guidance system 120 to display the location of the parking space that is ready to be free.

In examples when a vehicle has more than one passenger (i.e., vehicle data 152 has more than one associated instance of passenger data 154), prediction program 200 utilizes identified locations in the parking area of passengers of the vehicle to determine a number of passengers that have arrived at the vehicle, and a number of passengers that are moving toward the vehicle. For example, if prediction program 200 determines that an individual is at the parking space of the corresponding vehicle, or is within the distance threshold condition (determined in decision step 210), then the individual has arrived at the parking space of the vehicle and the parking space is ready to be free. Prediction program 200 can utilize stored indication in passenger data 154 that an individual is moving toward the vehicle, and that the individual is within the distance threshold condition. In another example for a vehicle that is a registered user of the parking area or a vehicle that frequently utilizes the parking area, prediction program 200 utilizes statistical model 156 associated with the corresponding vehicle to determine a probability that the vehicle will leave at the current time. For example, if the vehicle has been in the parking area for forty minutes, statistical model 156 provides a probability that the vehicle will leave the parking area after forty minutes (based on the vehicle's previous uses of the parking area).

In an example, prediction program 200 determines that the distance of an individual to a corresponding vehicle is within the distance threshold condition (decision step 210). Prediction program 200 determines that one of the three other passengers of the corresponding vehicle has already arrived at the vehicle, and the other two passengers are moving toward the vehicle. Statistical model 156 indicates that there is a 65% probability that the vehicle will leave the parking area at the current time. In this example, prediction program 200 determines to mark the parking space of the vehicle as ready to be free.

In another example, prediction program 200 determines that the distance of an individual to a corresponding vehicle is within the distance threshold condition (decision step 210). Prediction program 200 determines that zero of the three other passengers of the corresponding vehicle have already arrived at the vehicle, and zero passengers are moving toward the vehicle. Statistical model 156 indicates that there is a 40% probability that the vehicle will leave the parking area at the current time. In this example, prediction program 200 determines to not mark the parking space of the vehicle as ready to be free.

Figure 3:
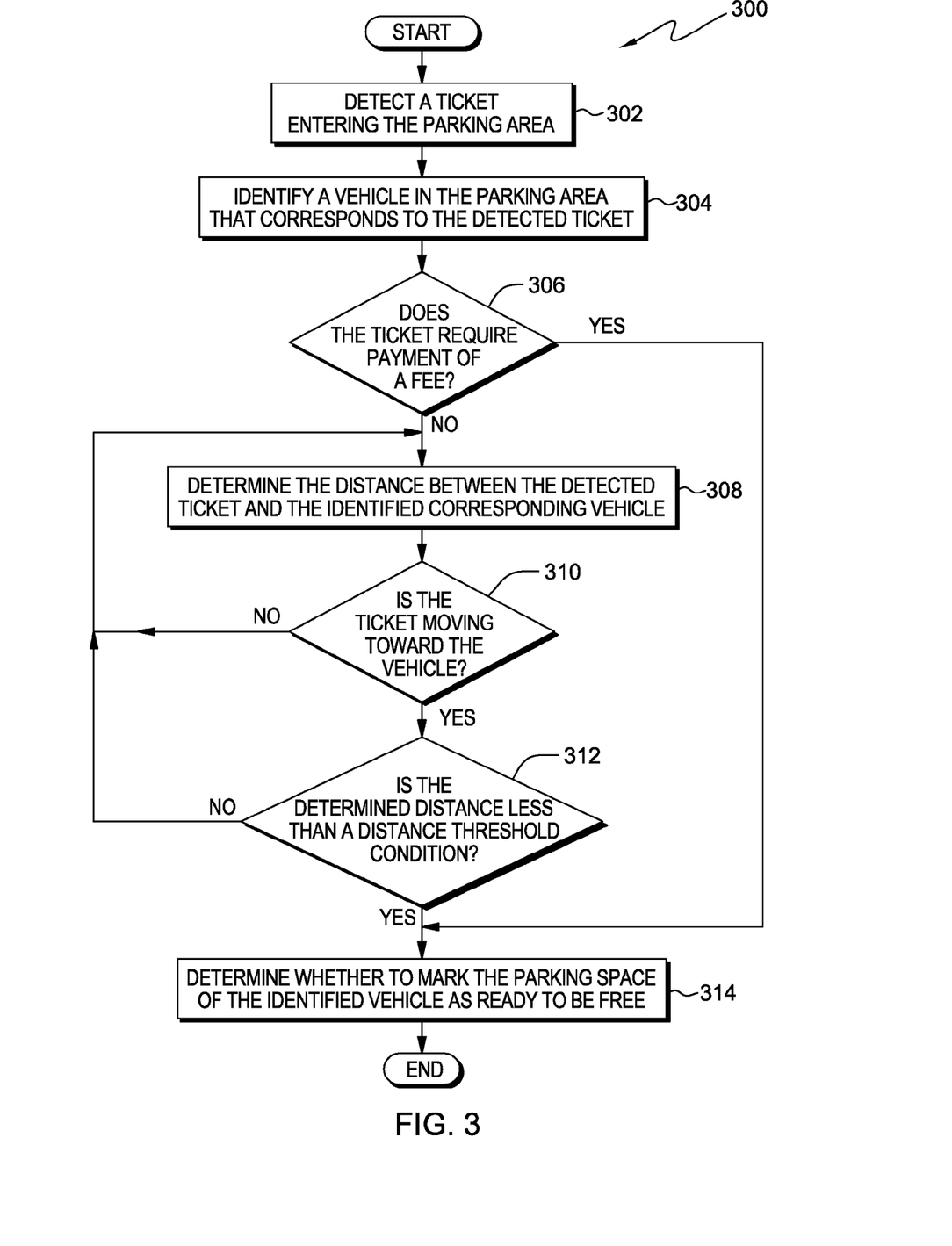
FIG. 3 is a flowchart depicting operational steps of a program for utilizing movement of a parking ticket in a parking area to determine whether a parking spot is ready to be free.

FIG. 3 is a flowchart depicting operational steps of ticket detection program 300 in accordance with an embodiment of the present invention. In one embodiment, ticket detection program 300 initiates responsive to ticket detection system 115 detecting that an individual with a parking ticket has entered the parking area. Ticket detection program 300 operates simultaneously for each parking ticket identified in the parking area.

Ticket detection program 300 identifies a ticket entering the parking area (step 302). In one embodiment, when an individual in possession of a ticket enters the parking area, ticket detection system 115 detects the individual coming through the entrance of the parking area (e.g., utilizing RFID sensors). Ticket detection program 300 identifies the corresponding instance of ticket data 158 corresponding to the identified ticket. Ticket detection program 300 identifies corresponding ticket data 158 for each ticket that is detected entering the parking area. In another embodiment, ticket detection program 300 identifies passenger information 154 that corresponds to the individual in possession of the ticket. In one embodiment, ticket detection program 300 is continuously monitoring the movement of the identified individual in the parking area.

Ticket detection program 300 then identifies a vehicle in the parking area that corresponds to the detected ticket (step 304). In one embodiment, ticket detection program 300 identifies vehicle data 152 that corresponds to ticket data 158 (identified in step 302). Ticket detection program 300 utilizes corresponding vehicle data 152 to identify the parking space of the vehicle corresponding to the ticket that entered the parking area.

Ticket detection program 300 then determines whether the ticket requires the payment of a fee (decision step 306). In one embodiment, ticket detection program 300 utilizes ticket data 158 to determine if the ticket has an associated required fee. For example, a prepaid ticket (e.g., parking pass), or a ticket in a free parking area do not require a fee. If ticket detection program 300 determines that the ticket does require payment of a fee, ticket detection program 300 proceeds to step 314 (decision step 306, "yes" branch).

Ticket detection program 300 then determines the distance between the detected ticket and the identified corresponding vehicle (step 308). In one embodiment, responsive to determining that the ticket does not require payment of a fee (decision step 306, "no" branch), ticket detection program 300 determines the distance between the detected ticket and the identified corresponding vehicle. In various embodiments, ticket detection program 300 utilizes cameras 110 and ticket detection system 115 to monitor the location of the ticket, and the individual in possession of the ticket. Ticket detection program 300 receives data from ticket detection system 115, which can utilize sensors (e.g., RFID sensors) to detect the location of the ticket, to determine the distance between the ticket and the parking space of the identified corresponding vehicle. Ticket detection program 300 receives photos and video from cameras 110 to determine the distance between the identified individual in possession of the ticket and the parking space of the identified corresponding vehicle. When the ticket is not being detected by a sensor of ticket detection system 115, cameras 110 can monitor the individual in possession of the ticket. Ticket detection program 300 can determine the distance between the detected ticket (or the individual in possession of the ticket), utilizing methods previously discussed with regard to step 206 of prediction program 200.

Ticket detection program 300 then determines whether or not the ticket is moving toward the vehicle (decision step 310). In one embodiment, ticket detection program 300 determines whether or not the ticket (i.e., the individual in possession of the ticket) is moving toward the parking space of the identified corresponding vehicle. Ticket detection program 300 can determine whether or not the ticket is moving toward the parking space of the identified corresponding vehicle utilizing methods previously discussed with regard to step 208 of prediction program 200. Responsive to determining that the ticket (i.e., the individual in possession of the ticket) is not moving toward the vehicle, ticket detection program 300 proceeds to step 308 (decision step 310, "no" branch). Ticket detection program 300 can store an indication that the ticket is moving toward the parking space of the identified corresponding vehicle in the corresponding instance of ticket data 158.

Ticket detection program 300 then determines whether the determined distance is less than a distance threshold condition (decision step 312). In one embodiment, responsive to determining that the ticket (i.e., the individual in possession of the ticket) is moving toward the parking space of the identified corresponding vehicle (decision step 310, "yes" branch), ticket detection program 300 determines whether the most recently determined distance of the ticket (e.g., determined distance in step 308, determined updated distance in decision step 310) is less than a previously defined distance threshold condition. The distance threshold condition is previously discussed with regard to decision step 210 of prediction program 200. Ticket detection program 300 can determine whether or not the determined distance is less than a distance threshold condition utilizing methods previously discussed with regard to decision step 210 of prediction program 200. Responsive to determining that the determined distance is not less than a distance threshold condition, ticket detection program 300 proceeds to step 308 (decision step 312, "no" branch). Ticket detection program 300 can store an indication that the determined distance of the ticket to the corresponding vehicle is less than the distance threshold in the corresponding instance of ticket data 158.

Ticket detection program 300 then determines whether to mark the parking space of the identified vehicle as ready to be free. In one embodiment, responsive to determining that the determined distance is less than a distance threshold condition (decision step 312, "yes" branch), ticket detection program 300 determines whether to mark the parking space of the identified vehicle as ready to be free. Ticket detection program 300 utilizes the indication that the determined distance of the ticket to the parking space of the identified corresponding vehicle is less than a distance threshold condition as one factor in the determination of whether or not to mark the parking space of the identified vehicle as ready to be free. In an embodiment, ticket detection program 300 also utilizes other factors, which may include, without limitation: a number of passengers of the corresponding vehicle that have arrived at the parking space of the vehicle, a number of passengers of the corresponding vehicle that prediction program 200 detects are moving toward the parking space of the vehicle, and statistical model 156 associated with the corresponding vehicle. Ticket detection program 300 can determine and utilize the other factors as previously discussed with regard to step 314 of prediction program 200. In example embodiments, responsive to determining to mark a parking space as ready to be free, ticket detection program 300 utilizes parking space guidance system 120 to display the location of the parking space that is ready to be free.

In another embodiment, responsive to determining that the ticket does require payment of a fee (decision step 306, "yes" branch) and payment of the fee is received; ticket detection program 300 determines whether to mark the parking space of the identified vehicle as ready to be free. Ticket data 158 can include an indication of whether of not a fee has been paid.

Figure 4:
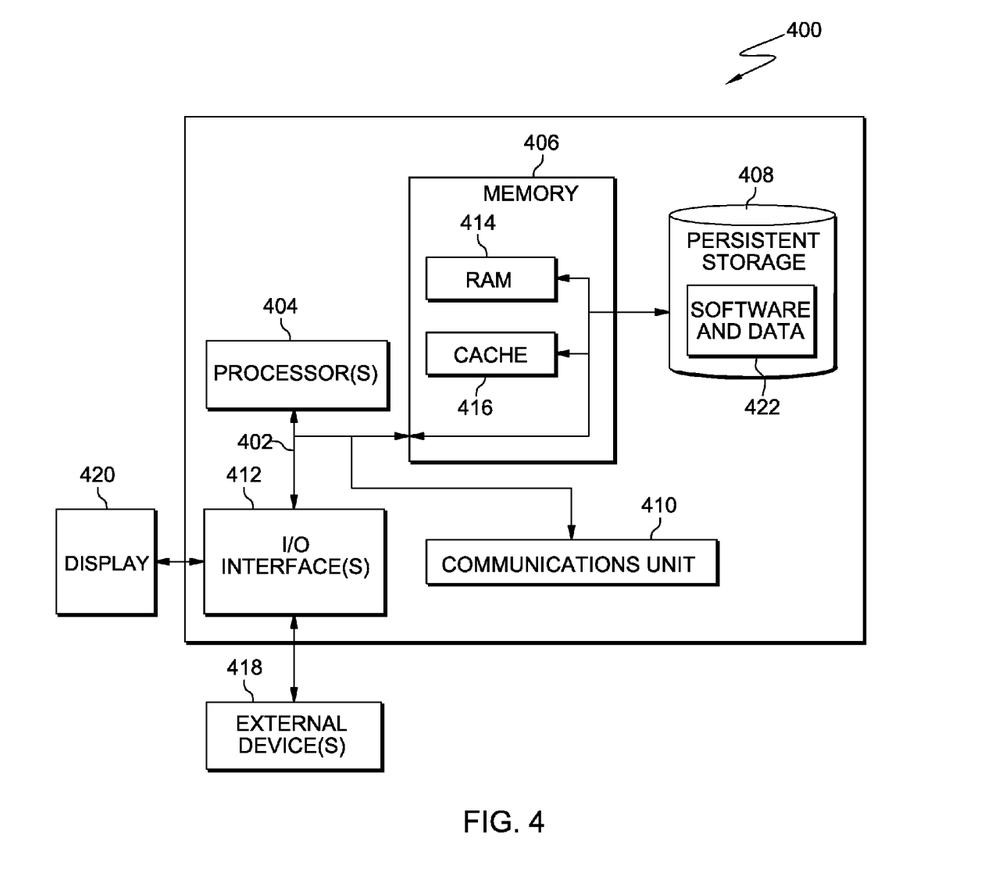
FIG. 4 depicts a block diagram of components of the computing system of FIG. 1 in accordance with an embodiment of the present invention.

FIG. 4 depicts a block diagram of components of computer 400, which is representative of parking space prediction engine 140 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media. Software and data 422 are stored in persistent storage for access and/or execution by processors 404 via one or more memories of memory 406. With respect to parking space prediction engine 140, software and data 422 represents statistical modeling software 142, passenger data 154, vehicle data 152, statistical model 156, ticket data 158, detection program 300, and ticket detection program 300.

In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 may include one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data 422 can be stored on such portable computer-readable storage media and can be loaded onto persistent storage 408 via I/O interface(s) 412. I/O interface(s) 412 also can connect to a display 420.

Display 420 provides a mechanism to display data to a user and may be, for example, a computer monitor. Display 420 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for management of parking spaces in a parking area carried out by one or more processors, the method comprising the steps of:

identifying an individual entering a parking area and a vehicle in the parking area that corresponds to the identified individual, wherein the individual is identified utilizing images and video received from cameras located in the parking area;
determining a distance between the identified individual and the identified vehicle in the parking area;
determining whether the determined distance is less than an associated distance threshold condition;
responsive to determining that the determined distance is less than the associated distance threshold condition, providing an indication that the parking space of the identified vehicle is ready to be free based on one or more of: a number of passengers of the identified vehicle that have arrived at the parking space of the identified vehicle, a number of passengers of the identified vehicle that are moving toward the parking space of the identified vehicle, and a statistical model associated with the identified vehicle; and
wherein the statistical model provides a probability of a departure time of a vehicle from the parking area relative to the arrival time of the vehicle to the parking area.

2. The method of claim 1, wherein the step of identifying the individual entering the parking area and the vehicle in the parking area that corresponds to the identified individual, further comprises the steps of:
detecting a parking ticket entering the parking area; and
identifying an individual and a vehicle in the parking area that correspond to the detected parking ticket,
wherein the parking ticket is associated with a vehicle currently parked in the parking area.

3. The method of claim 1, wherein determining whether the determined distance is less than an associated distance threshold condition, comprises:
determining whether the identified individual is moving toward the identified vehicle based on monitored movement of the identified individual in the parking area; and
responsive to determining that the identified individual is moving toward the identified vehicle, determining whether the determined distance is less than an associated distance threshold condition.

4. The method of claim 2, wherein the step of detecting the parking ticket entering the parking area further comprises the step of detecting the parking ticket entering the parking area utilizing sensors located in the parking area.

5. The method of claim 3, wherein the step of determining whether the identified individual is moving toward the identified vehicle, further comprises the steps of:
monitoring movement of the identified individual in the parking area; and
determining whether the determined distance between the identified individual and the identified vehicle in the parking area is decreasing.

6. The method of claim 2, further comprising the steps of:
determining whether the detected parking ticket requires a fee to be paid; and
responsive to receiving an indication that the required fee has been paid, providing an indication that the parking space of the identified vehicle is ready to be free.

7. The method of claim 1, further comprising the step of:
responsive to determining that the determined distance is not less than the associated distance threshold condition, determining an updated distance between the identified individual and the identified vehicle in the parking area.

8. A computer program product for management of parking spaces in a parking area, the computer program product comprising:
one or more computer-readable storage medium and program instructions stored on the one or more computer-readable storage medium, the program instructions comprising:
program instructions to identify an individual entering a parking area and a vehicle in the parking area that corresponds to the identified individual, wherein the individual is identified utilizing images and video received from cameras located in the parking area;
program instructions to determine a distance between the identified individual and the identified vehicle in the parking area;
program instructions to determine whether the determined distance is less than an associated distance threshold condition; and
responsive to determining that the determined distance is less than the associated distance threshold condition, program instructions to provide an indication that the parking space of the identified vehicle is ready to be free based on one or more of: a number of passengers of the identified vehicle that have arrived at the parking space of the identified vehicle, a number of passengers of the identified vehicle that are moving toward the parking space of the identified vehicle, and a statistical model associated with the identified vehicle,
wherein the statistical model provides a probability of a departure time of a vehicle from the parking area relative to the arrival time of the vehicle to the parking area.

9. The computer program product of claim 8, wherein program instructions to identify the individual entering the parking area and the vehicle in the parking area that corresponds to the identified individual further comprise program instructions to:
detect a parking ticket entering the parking area; and
identify an individual and a vehicle in the parking area that correspond to the detected parking ticket,
wherein the parking ticket is associated with a vehicle currently parked in the parking area.

10. The computer program product of claim 8, wherein program instructions to determine whether the determined distance is less than an associated distance threshold condition, comprise program instructions to:
determine whether the identified individual is moving toward the identified vehicle based on monitored movement of the identified individual in the parking area; and
responsive to determining that the identified individual is moving toward the identified vehicle, determine whether the determined distance is less than an associated distance threshold condition.

11. The computer program product of claim 10, wherein program instructions to determine whether the identified individual is moving toward the identified vehicle further comprise program instructions to:
monitor movement of the identified individual in the parking area; and
determine whether the determined distance between the identified individual and the identified vehicle in the parking area is decreasing.

12. The computer program product of claim 9, further comprising program instructions, stored on the one or more computer-readable storage medium, to:

determine whether the detected parking ticket requires a fee to be paid; and responsive to receiving an indication that the required fee has been paid, provide an indication that the parking space of the identified vehicle is ready to be free.

13. The computer program product of with claim 8, further comprising program instructions, stored on the one or more computer-readable storage medium, to:

responsive to determining that the determined distance is not less than the associated distance threshold condition, determine an updated distance between the identified individual and the identified vehicle in the parking area.

14. A computer system for management of parking spaces in a parking area, the computer system comprising:

one or more computer processors;

one or more computer-readable storage medium; and program instructions stored on the one or more computer-readable storage devices for execution by at least one of the one or more processors, the program instructions comprising:

program instructions to identify an individual entering a parking area and a vehicle in the parking area that corresponds to the identified individual, wherein the individual is identified utilizing images and video received from cameras located in the parking area;

program instructions to determine a distance between the identified individual and the identified vehicle in the parking area;

program instructions to determine whether the determined distance is less than an associated distance threshold condition; and responsive to determining that the determined distance is less than the associated distance threshold condition, program instructions to provide an indication that the parking space of the identified vehicle is ready to be free based on one or more of: a number of passengers of the identified vehicle that have arrived at the parking space of the identified vehicle, a number of passengers of the identified vehicle that are moving toward the parking space of the identified vehicle, and a statistical model associated with the identified vehicle, wherein the statistical model provides a probability of a departure time of a vehicle from the parking area relative to the arrival time of the vehicle to the parking area.

15. The computer system of claim 14, wherein the program instructions to identify the individual entering the parking area and the vehicle in the parking area that corresponds to the identified individual comprise program instructions to:

detect a parking ticket entering the parking area; and identify an individual and a vehicle in the parking area that correspond to the detected parking ticket, wherein the parking ticket is associated with a vehicle currently parked in the parking area.

16. The computer system of claim 14, wherein program instructions to determine whether the determined distance is less than an associated distance threshold condition, comprise program instructions to:

determine whether the identified individual is moving toward the identified vehicle based on monitored movement of the identified individual in the parking area; and responsive to determining that the identified individual is moving toward the identified vehicle, determine whether the determined distance is less than an associated distance threshold condition.

17. The computer system of claim 15, wherein the program instructions to detect the parking ticket entering the parking area further comprises program instructions to detect the parking ticket entering the parking area utilizing sensors located in the parking area.

18. The computer system of claim 16, wherein the program instructions to determine whether the identified individual is moving toward the identified vehicle comprise program instructions to:

monitor movement of the identified individual in the parking area; and determine whether the determined distance between the identified individual and the identified vehicle in the parking area is decreasing.

19. The computer system of claim 15, further comprising program instructions to:

determine whether the detected parking ticket requires a fee to be paid; and responsive to receiving an indication that the required fee has been paid, provide an indication that the parking space of the identified vehicle is ready to be free.

20. The computer system of claim 14, further comprising program instructions to:

responsive to determining that the determined distance is not less than the associated distance threshold condition, determine an updated distance between the identified individual and the identified vehicle in the parking area.

\* \* \* \* \*